(No Model.) 2 Sheets—Sheet 2.

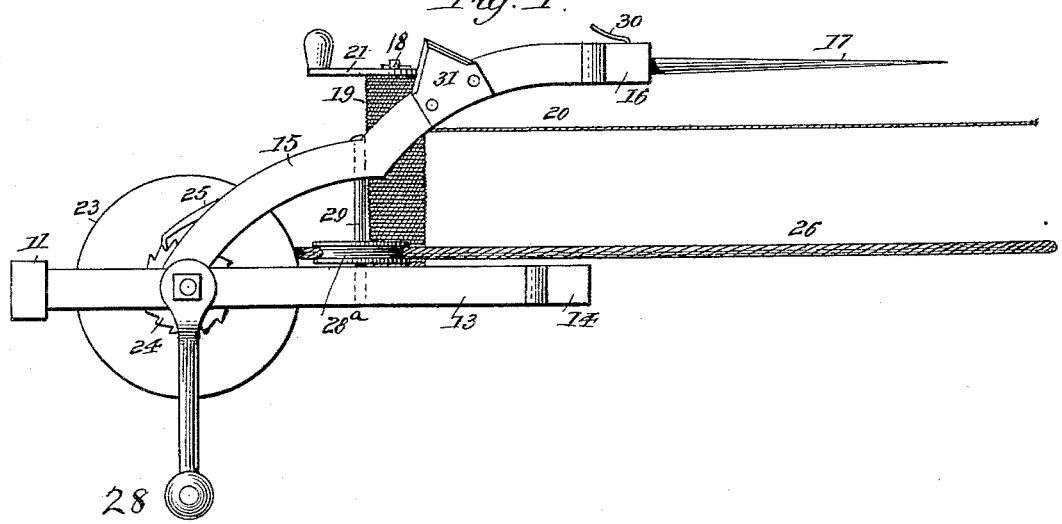
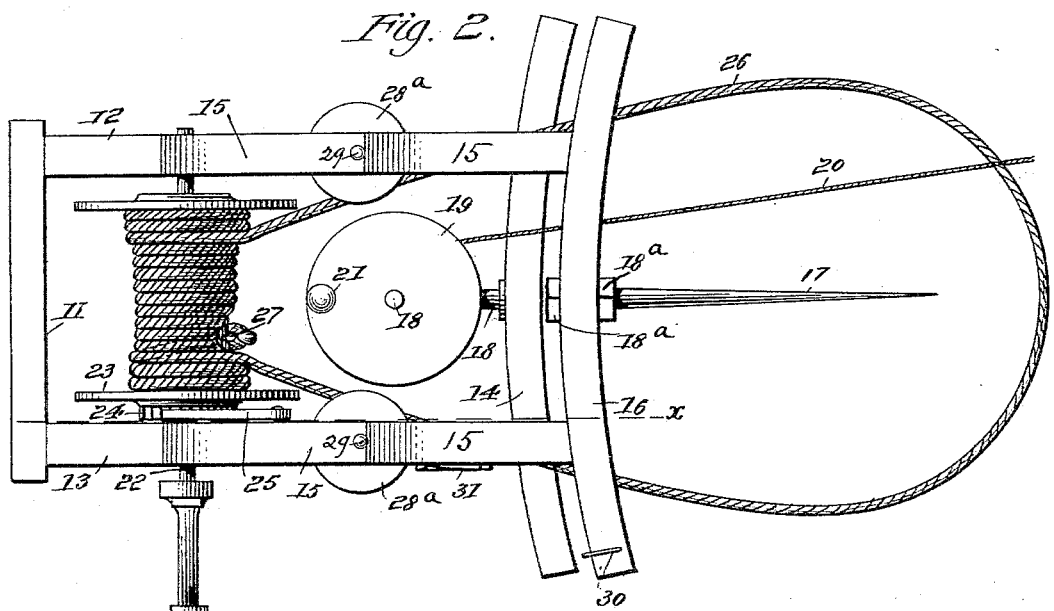
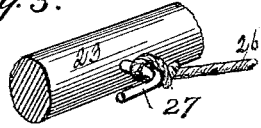

C. BEU.
SHOCK BINDER.

No. 398,935. Patented Mar. 5, 1889.

WITNESSES:
J. H. Clark.
C. Sedgwick.

INVENTOR:
C. Beu

BY Munn & Co.
ATTORNEYS.

UNITED STATES PATENT OFFICE.

CHRISTIAN BEU, OF MOLINE, KANSAS, ASSIGNOR OF ONE-HALF TO JOHN DUNLAP, OF SAME PLACE.

SHOCK-BINDER.

SPECIFICATION forming part of Letters Patent No. 398,935, dated March 5, 1889.

Application filed August 3, 1888. Serial No. 281,846. (No model.)

*To all whom it may concern:*

Be it known that I, CHRISTIAN BEU, of Moline, in the county of Elk and State of Kansas, have invented a new and Improved Shock-Binder, of which the following is a full, clear, and exact description.

My invention relates to an improvement in shock-binders, and has for its object to provide a device for compressing shocks of corn or grain, and also to provide a means for expeditiously and conveniently tying the said shocks when compressed; and the further object of the invention is to provide a device of simple and effective construction, light of weight, and readily portable.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 3:
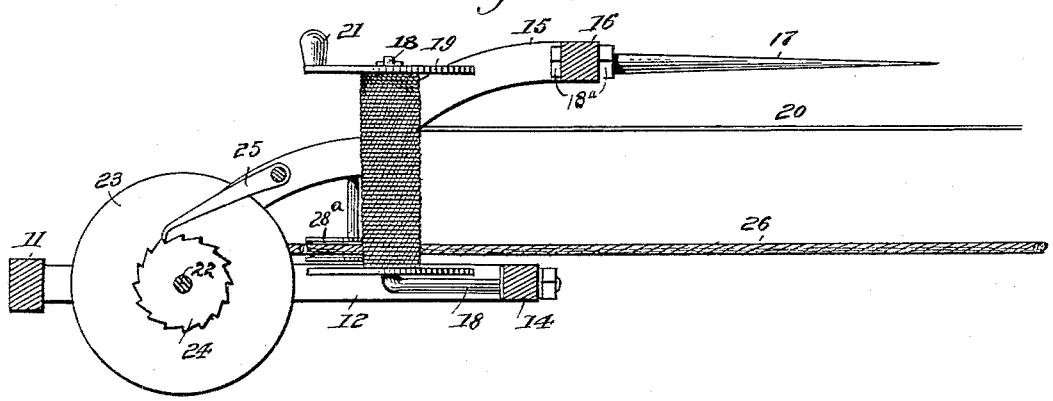
Figure 4:
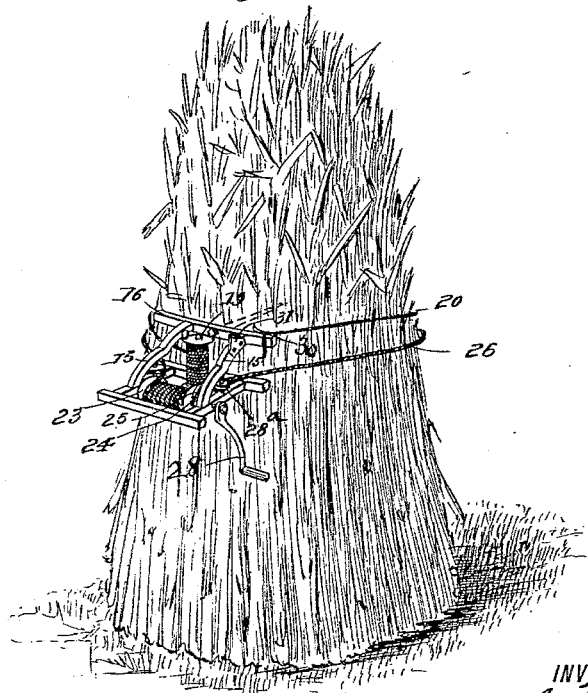

Figure 1 is a side elevation of the binder. Fig. 2 is a plan view of the same. Fig. 3 is a longitudinal vertical section on the line $x\,x$ of Fig. 2, and Fig. 4 is a perspective view of the device, illustrating the application thereof to a shock. Fig. 5 is a detail view of the hook 27.

In carrying out the invention the frame consists of an end cross-bar, 11, two parallel side bars, 12 and 13, attached to the said end cross-bar, and a curved forward cross-bar, 14, attached in any approved manner to the said side bars, the said forward cross-bar, 14, being concaved upon the outer face and of a length sufficient to extend a distance beyond the side bars, as best illustrated in Fig. 2. To the upper face of the several side bars, 12 and 13, brackets 15 are secured, which brackets are made bow-shaped and to extend upward and curve in direction of the forward or concaved cross-bar, 14, as best shown in Figs. 1 and 3.

The outer or free ends of the brackets 15 extend beyond the outer face of the curved cross-bar 14, and to the said free extremities of the said brackets a second curved cross-bar, 16, is secured, of similar construction to the lower cross-bar, 14. From the center of the upper cross-bar, 16, a spear or sharp metal finger, 17, is outwardly projected, which finger is secured to the cross-bar by being screwed therein and held in position by suitable lock-nuts $18^{a}$.

Immediately below the spear or finger 17 an inwardly-projecting angle-spindle, 18, is attached to the lower curved cross-bar, 14, the vertical member of said spindle being located preferably centrally between the side brackets, 15, as best shown in Fig. 2. The spindle 18 is adapted to receive a reel, 19, upon which reel cord or wire 20 is wound purposed to tie the shocks. The upper plate of the reel is provided with a handle, 21, to facilitate winding the cord or wire thereon. To the rear of the reel 19 a shaft, 22, is transversely journaled in the side bars of the frame, upon which shaft between the side bars a drum, 23, is mounted, one outer side of the said drum being provided with a ratchet-wheel, 24, adapted for engagement with a pawl, 25, pivoted to the inner face of one of the brackets 15, as best illustrated in Figs. 2 and 3.

The drum 23 is purposed to carry a strong rope, 26, one end of which rope is permanently secured to the drum, the other end being adapted for attachment to a hook, 27, forming an integral portion of the drum or secured thereto, as desired. The drum is rotated through the medium of a crank, 28, secured to one end of the transverse shaft 22.

Two guide-pulleys, $28^{a}$, are provided for the rope 26, one of which pulleys is journaled between each of the brackets 15 and the side bars beneath the same through the medium of a spindle, 29, passing through the said brackets into the frame, as best shown in Fig. 1.

The object of advancing the upper curved cross-bar beyond the lower bar is that when the device is drawn in close engagement with the shock the shock will be given a proper shape and the device rest squarely thereon.

In operation the spear 17 is inserted in the shock at the point or place to be tied. The operator then steps preferably to the left of the shock, taking the free end of the large rope 26 and the end of the cord or wire 20 in his hand, keeping the cord or wire on the top or above the rope as they are passed around the shock. The operator having made the circuit of the shock, the smaller cord or wire, 20, is passed beneath a spring hook or clamp, 30, secured upon the upper curved cross-bar, 16, at or near its extremity, as best illustrated in Figs. 1 and 4. The free end of the rope 26 is now attached to the hook 27 of the drum and the drum rotated, the pawl 25 being elevated until the shock is sufficiently compressed, whereupon the pawl is dropped downward to an engagement with the ratchet 24. The smaller cord or wire is now released from the reel 19 by reversing its handle 21 and the shock properly tied, whereupon the wire or cord is severed by engaging the same with the edges of a preferably triangular knife, 31, attached to the outer side of one of the brackets 15, as best illustrated in Figs. 1 and 4. After tying, the rope 26 is loosened and detached, and the device may be readily removed from the shock by simply pulling it outward from the shock.

The top curved cross-bar projecting out the farthest serves to keep the binder square with the shock to be tied, and the binding-rope drawing from both ends imparts to the shock a regular shape, instead of leaving it in a twisted form, as would occur if the rope were drawn entirely from one end.

To fill the reel 19 with wire or cord, the spear 17 is pressed into the ground, which will bring the said reel in a horizontal position, whereby the reel may be readily manipulated by the handle 21, integral therewith.

Having thus described my invention, what I claim as new, and desire to secure by Letters Patent, is—

1. In a shock-binder, the combination, with an essentially-rectangular frame provided with a forward curved cross-bar, brackets projected upwardly and forwardly from the said frame, and a curved upper cross-bar secured to the extremities of the said brackets in advance of the lower cross-bar, of a drum carrying a tightening-rope journaled in the frame, a reel vertically supported from the lower curved cross-bar to carry the binding cord or wire, and a spear attached to the center of the upper cross-bar, substantially as shown and described.

2. In a shock-binder, the combination, with a frame provided with a front cross-bar of greater length than the width of the frame, having a concaved outer face, brackets projected upward and outward from the side bars of the frame in vertical plane with the side bars, an upper cross-bar, also having a concaved face, secured to the brackets in advance of the lower cross-bar, and a spear horizontally projected from the outer face of the said upper cross-bar, of a drum journaled transversely in the frame adapted to carry a compressing-rope, a ratchet-wheel secured to the said drum, a pawl pivoted to the frame engaging the ratchet-wheel, an angled spindle rearwardly projecting attached to the inner side of the lower cross-bar, and a reel journaled upon the said spindle to carry the binding rope or wire, all combined to operate substantially in the manner and for the purpose specified.

3. In a shock-binder, the combination, with a frame, a cross-bar secured to the forward end of the said frame having a curved outer face, brackets projected upwardly and outwardly from the side bars of the frame, a second cross-bar secured to the extremities of the said brackets in advance of and concentric with the lower cross-bar, and a spear horizontally attached to the center of the outer face of the upper cross-bar, of a drum transversely journaled in the frame, a compressing-rope secured to the said drum, a ratchet-wheel attached to the drum, and a pawl engaging the said ratchet, guide-pulleys journaled between the frame and brackets, an angled spindle projected centrally and rearwardly from the inner face of the lower cross-bar, a reel journaled on said spindle, a tying or binding rope secured to said reel, a clamp-hook attached to the upper cross-bar, and a knife secured to the outer face of one bracket adjacent to the said hook, all combined to operate substantially as shown and described.

4. In a shock-binder, the combination, with a frame, a cross-bar secured to the forward end of the frame provided with a concaved outer face, brackets projected upwardly and forwardly from the said side bars of the frame, an upper curved cross-bar attached to the extremities of the said brackets in advance of and concentric with the lower cross-bar, a clamp-hook secured to the upper cross-bar near one extremity, and a knife projecting upward from the bracket contiguous to the said clamp-hook, of a drum journaled in the frame adapted to carry a compressing-rope, an angled spindle projected rearwardly from the lower cross-bar, a reel journaled upon the said spindle carrying a binding-rope, a spear attached to the outer face of the upper cross-bar, and means, substantially as shown and described, for locking the drum, as set forth.

CHRISTIAN BEU.

Witnesses:
W. A. GORTON,
J. D. DUNLAP.